(12) United States Patent
Hemes et al.

(10) Patent No.: US 10,053,102 B2
(45) Date of Patent: Aug. 21, 2018

(54) VEHICLE CONTROL SYSTEM AND METHOD FOR AUTOMATIC CONTROL OF VEHICLE SUBSYSTEMS

(71) Applicant: Jaguar Land Rover Limited, Whitley, Coventry, Warwickshire (GB)

(72) Inventors: Elliot Hemes, Solihull (GB); Dan Dennehy, Leamington Spa (GB); Andrew Fairgrieve, Rugby (GB); James Kelly, Solihull (GB); Sam Anker, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 65 days.

(21) Appl. No.: 15/317,909

(22) PCT Filed: Jun. 10, 2015

(86) PCT No.: PCT/EP2015/062902
§ 371 (c)(1),
(2) Date: Dec. 9, 2016

(87) PCT Pub. No.: WO2015/189251
PCT Pub. Date: Dec. 17, 2015

(65) Prior Publication Data
US 2017/0137026 A1 May 18, 2017

(30) Foreign Application Priority Data
Jun. 11, 2014 (GB) .................................. 1410374.1

(51) Int. Cl.
*B60W 30/182* (2012.01)
*B60W 50/04* (2006.01)
(Continued)

(52) U.S. Cl.
CPC ....... *B60W 30/182* (2013.01); *B60R 16/0232* (2013.01); *B60W 10/06* (2013.01);
(Continued)

(58) Field of Classification Search
CPC ............... B60W 30/182; B60W 50/10; B60W 2050/0095; B60W 2550/148
See application file for complete search history.

(56) References Cited

U.S. PATENT DOCUMENTS 5,680,309 A    10/1997  Rauznitz et al.
7,162,346 B2 *  1/2007  Berry .................... B60W 10/06
                                                           701/1

(Continued)

FOREIGN PATENT DOCUMENTS

EP   1355209 A1   10/2003
GB   2492655 A    1/2013
GB   2499252 A    8/2013

OTHER PUBLICATIONS

Combined Search and Examination Report for application No. GB1410374.1, dated Dec. 10, 2014, 6 pages.
(Continued)

*Primary Examiner* — Todd Melton
(74) *Attorney, Agent, or Firm* — Reising Ethington P.C.

(57) ABSTRACT

A motor vehicle control system for controlling a plurality of vehicle subsystems to operate in a plurality of subsystem control modes in dependence on a driving surface. The system is operable in an automatic control mode selection condition in which the system is configured to determine the driving surface automatically and to cause each of the vehicle subsystems to operate in a predetermined one of the subsystem control modes in dependence on the determined driving surface. The system may be configured to determine if an interruption in powertrain torque occurs and to, in dependence on the identification of a powertrain torque (Continued)

interruption event, temporarily suspend causing an automatic change to the predetermined one of the subsystem control modes in which each subsystem is operating.

20 Claims, 4 Drawing Sheets (51) Int. Cl.
| | |
|---|---|
| *B60W 50/08* | (2012.01) |
| *B60R 16/023* | (2006.01) |
| *B60W 40/06* | (2012.01) |
| *B60W 10/10* | (2012.01) |
| *B60W 10/20* | (2006.01) |
| *B60W 10/22* | (2006.01) |
| *B60W 10/18* | (2012.01) |
| *G05D 1/00* | (2006.01) |
| *B60W 10/06* | (2006.01) |
| *B60W 50/10* | (2012.01) |
| *B60W 50/00* | (2006.01) |

(52) U.S. Cl.
CPC .......... *B60W 10/10* (2013.01); *B60W 10/18* (2013.01); *B60W 10/20* (2013.01); *B60W 10/22* (2013.01); *B60W 40/06* (2013.01); *B60W 50/045* (2013.01); *B60W 50/082* (2013.01); *B60W 50/10* (2013.01); *G05D 1/0061* (2013.01); *B60W 2050/0095* (2013.01); *B60W 2510/0638* (2013.01); *B60W 2510/0657* (2013.01); *B60W 2540/10* (2013.01); *B60W 2550/148* (2013.01)

(56) References Cited

U.S. PATENT DOCUMENTS

| | | | |
|---|---|---|---|
| 7,263,419 B2* | 8/2007 | Wheals | B60T 8/172 |
| | | | 701/36 |
| 7,349,776 B2 | 3/2008 | Spillane et al. | |
| 7,577,508 B2* | 8/2009 | Fitzgibbons | B60G 17/0195 |
| | | | 701/70 |
| 8,452,504 B2* | 5/2013 | Dickinson | F16H 61/702 |
| | | | 180/65.28 |
| 9,440,659 B2 | 9/2016 | Kelly et al. | |
| 9,623,879 B2* | 4/2017 | Ellis | B60W 50/087 |
| 2007/0016351 A1 | 1/2007 | Allen et al. | |
| 2014/0350789 A1 | 11/2014 | Anker et al. | |

OTHER PUBLICATIONS

International Search Report for International application No. PCT/EP2015/062902, dated Oct. 2, 2015, 6 pages.

Written Opinion for International application No. PCT/EP2015/062902, dated Oct. 2, 2015, 6 pages.

* cited by examiner

| SP = Speed Proportional<br>TM = Towing Mode | | Motorway | Country Road | City Driving | Towing (on Road) | Dirt Track (Developing World Road) | Snow / Ice (Scandinavian / North America Conditions) | Grass/ gravel/ snow | Sand | Rock/ Crawl/ Boulder Crossing | Mud & ruts |
|---|---|---|---|---|---|---|---|---|---|---|---|
| Suspension Ride Height | High | | | | | | | | | X | |
| | Standard | | X | X | X | X | X | X | X | | X |
| | Low | X | | | | | | | | | |
| Side / Side Air Interconnection | Closed | X | X | X | X | X | X | | | X | |
| | Open | | | | | | | X | X | X | X |
| Steering Assistance Level | High | SP | SP | SP | SP | SP | SP | SP | SP | X | SP |
| | Low | | | | | | | | | | |
| Brake Pedal Efforts | High | X | X | X | | X | X | X | X | | X |
| | Low | | (X) | X | X | | | | | X | |
| A.B.S. Mode | High mu | X | X | | X | | | | | X | |
| | Low mu | | | | | X | X | X | X | | X |
| | Plough Surface | | | | | | | | X | | |
| E.T.C. Mode | High mu | X (2) | X | X | X | | | | | | |
| | Low mu | | | | | X | X | X | | X | X |
| D.S.C. Mode | High mu | X | X | X | TM | X | X | X | X | X | X |
| | Low mu | | | | | X | X | | | | |
| Throttle Progression | Quick | | (X) | | (X) | | | | X | | |
| | Slow | X | X | X | X | X | X | X | | X | X |
| Transfer Box | High Range | X | X | X | X | X | X | X | X | X | X |
| | Low Range | | | | | | | | | | |
| Centre Diff Lock | Open | X | X | X | X | X | X | X | X | X | X |
| | Locked | | | | | | | | | | |
| Rear Diff Lock | Open | X | X | X | X | X | X | X | (X) | X | X |
| | Locked | | | | | | | | | X | X |

VEHICLE CONTROL SYSTEM AND METHOD FOR AUTOMATIC CONTROL OF VEHICLE SUBSYSTEMS

INCORPORATION BY REFERENCE

The entire contents of co-pending UK patent application number GB1202427.9 (publication number GB2499252), UK patents GB2325716, GB2308415, GB2341430, GB2382158, GB2381597, GB2492748 and GB2492655 and US2003/0200016 are expressly incorporated herein by reference.

FIELD OF THE INVENTION

The present invention relates to a vehicle control system for one or more vehicle subsystems and to a method of controlling one or more vehicle subsystems.

BACKGROUND

It is known to provide a vehicle having a plurality of subsystems which can be operated in different configurations to suit different driving conditions. For example, the powertrain may be controlled in a variety of modes such as sport, manual, winter or economy. In each mode, subsystem control parameters such as accelerator pedal response and conditions under which any automatic changes between gear ratios take place may be modified so as to suit the conditions of the terrain or the particular taste of the driver. It is also known to provide air suspensions with on-road and off-road modes. Stability control systems can be operated at reduced activity in certain modes so as to give the driver more direct control, and power steering systems can be operated in different modes to provide a varying level of assistance depending on driving conditions.

In a known vehicle control system allowing selection of control modes optimized for different driving conditions, mode selection is entirely manual. The control system (which may also be referred to as a terrain response (TR) control system) responds to a user request for operation in a given control mode according to the position of a control knob. If the control knob has been left in a given mode (such as a grass/gravel/snow (GGS) mode) at key-off then the control system may assume the GGS mode at the next key-on, unless the control knob has been adjusted. Thus the position of the control knob determines the control mode that will be assumed by the controller. Alternatively if selection is by means of an electrical button as opposed to a switch having definite positions, during key-off the system may retain the last selected mode for a predetermined time period.

In another known system, for example as described in WO2014037325 it is known for the system to automatically select what it determines to be the most appropriate terrain setting based on the identification of terrain indicator signals which are derived from sensors around the car, and which will produce different responses in dependence on the terrain over which the vehicle is travelling. It is to be understood that such a control system is able to determine confidently the type of terrain over which the vehicle is moving and determine the most appropriate control mode in a relatively short distance of travel (approximately less than two car lengths in some embodiments). When a vehicle moves from rest following key-on, the control system may in some embodiments be able to determine the most appropriate terrain relatively quickly and be ready to command a change in selected mode if required.

GB2492655 discloses a similar system for automatically detecting the terrain over which the vehicle is travelling and to automatically select the appropriate control mode in dependence on sensed parameters. This document discloses stopping performing an integral function of the control algorithm that sets the appropriate terrain mode if, for example it is detected that the gear is being changed.

The present applicant has recognized that automatic mode selection functionality can be less reliable when incorporated into vehicles having manual transmissions.

It is desirable to provide an improved control system for a motor vehicle having automatic driving mode selection functionality and a manual transmission.

SUMMARY

Embodiments of the invention may be understood with reference to the appended claims.

Aspects of the present invention provide a control system, a controller, a vehicle and a method.

In one aspect of the invention for which protection is sought there is provided a motor vehicle control system for controlling a plurality of vehicle subsystems to operate in a plurality of subsystem control modes in dependence on a driving surface. The system is operable in an automatic control mode selection condition in which the system is configured to determine said driving surface automatically and to cause each of the plurality of vehicle subsystems to operate in a predetermined one of said plurality of subsystem control modes in dependence on the determined driving surface. The system is configured to determine if an interruption in powertrain torque occurs and to, in dependence on the identification of a powertrain torque interruption event, temporarily suspend causing an automatic change to said predetermined one of said plurality of subsystem control modes in which each subsystem is operating.

This has the advantage that, during a torque interruption event, the subsystems remain in the subsystem control mode in which they operated immediately prior to the occurrence of the torque interruption event. Accordingly, a change in control mode to a control mode inappropriate to the terrain over which a vehicle is travelling is prevented. It is to be understood that the occurrence of a torque interruption event may cause an erroneous selection or determination of the driving surface, for example due to a change in a parameter associated with the vehicle that is used in order to select or determine the driving surface. For example, in some embodiments the driving surface may be selected or determined in dependence at least in part on an amount of wheel slip between a driving wheel and terrain. A reduction in wheel slip may occur due to the torque interruption, resulting in an erroneous estimation of the surface coefficient of friction between the wheels of the vehicle and the driving surface. This may result in the control system selecting an inappropriate control mode for one or more of the subsystems. In particular this is advantageous over the system described in GB2492655 as in the system of GB2492655 if a terrain mode change is calculated and immediately, i.e. before the change can be carried out, the driver changes gear, or there is an alternative disruption in powertrain torque, then the system will still change the control mode during the powertrain interruption. This may result in an unexpected change in vehicle characteristic on resumption of powertrain torque that may affect vehicle composure. As an example, when changing gear on a vehicle with a manual gearbox the driver will usually return the accelerator to the zero displacement position prior to displacing the clutch. If the change in control mode results in a change in throttle map and the control mode changes while the clutch is depressed, based on signals received immediately prior to the clutch being depressed, then once the gear change is complete and the driver presses the accelerator pedal, unless there are other systems in place to manage changes between throttle maps then the driver may experience a different vehicle response as a result. The present invention in contrast suspends gear changes during a toque interruption. Similar reductions in composure may result from different subsetting changes during a torque interruption. Accordingly the possible reduction in composure can be reduced or eliminated by the present invention.

The automatic control mode selection condition may also be referred to as an automatic operating mode or automatic control mode.

The control system may be further operable in a manual control mode selection condition in which a user may select manually the driving surface.

The manual control mode selection condition may also be referred to as a manual operating mode or manual control mode.

Optionally, when operating in the automatic control mode selection condition, the system is configured to select the most appropriate subsystem control mode by:

(1) for each type of control mode, calculating the probability that the control mode is suitable for the terrain or driving surface over which the vehicle is travelling, based on a plurality of terrain indicators, the terrain indicators being determined according to the value of one or more vehicle operating parameters;

(2) integrating positive differences between the probability for the current control mode and that for each of the other control modes; and (3) when the integrated value of the positive differences between the current control mode and one of the other control modes exceeds a pre-determined threshold, assuming that control mode.

Optionally the system is configured, during a torque interruption event, to suspend changes in a predetermined one or more of the plurality of terrain indicators.

Optionally, the predetermined one or more terrain indicators for which changes are suspended are terrain indicators calculated according to the value of one or more vehicle operating parameters indicative of one or more selected from amongst a speed of a portion of a driveline of a vehicle, a position of an accelerator control and an amount of torque generated by a prime mover of a powertrain.

The prime mover may be an engine, an electric motor or any other suitable prime mover.

Optionally the system may be configured, during a torque interruption event, to suspend changes in the probability that each type of control mode is suitable for the terrain or driving surface over which the vehicle is travelling.

The system may be configured to determine that a torque interruption has occurred in dependence at least in part on the state of a user operated clutch control.

Optionally the system is configured to determine that a torque interruption has occurred in dependence at least in part on a determination that an automatic clutch has been activated to permit a change in selected gear ratio of a transmission.

It is to be understood that in some embodiments the change in selected gear ratio of the transmission may be a change in selected gear, for example a change from third gear to fourth gear, or a change from a neutral condition in which no gear ratio is selected to a driving gear or from a driving gear to the neutral condition.

The system may be configured to determine that a torque interruption has occurred in dependence at least in part on the receipt of an electrical signal indicative of a change in selected gear ratio.

Optionally the system is configured to determine that a torque interruption has occurred in dependence at least in part on receipt of an electrical signal indicative of activation by a user of a transmission gear selector control.

The transmission gear selector control may be a gear stick, a paddle shifter or any other suitable transmission gear selector control.

It is to be understood that the transmission gear selector control may be operable to select a forward driving gear condition or a neutral condition in which the transmission is configured neither for travel in a forward nor reverse direction.

The system may be configured to determine that a torque interruption has occurred if neither a forward nor a reverse gear of a transmission is selected.

Optionally, the system may be configured to determine that a torque interruption has occurred if a range change transmission of the vehicle is transitioning from a high range mode to a low range mode or a low range mode to a high range mode.

Optionally the system may be configured wherein the control modes are control modes of at least two vehicle subsystems selected from amongst an engine management system, a transmission system, a steering system, a brakes system and a suspension system.

The system according may comprise a controller. The system may comprise a plurality of controllers.

It is to be understood that the controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The controller and or control system may be implemented in software run on one or more processors. One or more other controllers may be implemented in software run on one or more processors, optionally the same one or more processors as the controller. Other arrangements are also useful.

In a further aspect of the invention for which protection is sought there is provided a vehicle comprising a system according to another aspect.

In one aspect of the invention for which protection is sought there is provided a vehicle comprising a body, a plurality of wheels, a powertrain to drive said wheels, a braking system to brake said wheels, and a system according to another aspect.

In a further aspect of the invention for which protection is sought there is provided a method of controlling a motor vehicle implemented by a control system. The method comprising selecting and/or determining automatically a driving surface and controlling a plurality of vehicle subsystems to operate in a plurality of subsystem control modes in dependence on the selected/determined driving surface. The method also comprises suspending causing a change in the subsystem control mode in which each subsystem is operating in dependence on the occurrence of a powertrain torque interruption event.

In an aspect of the invention for which protection is sought there is provided a method of controlling a plurality of vehicle subsystems to operate in a plurality of subsystem control modes in dependence on a driving surface. The method comprises determining said driving surface automatically and causing each of the plurality of vehicle subsystems to operate in a predetermined one of said plurality of subsystem control modes in dependence on the determined driving surface. The method also comprises determining if an interruption in powertrain torque occurs and, in dependence on the identification of a powertrain torque interruption event, temporarily suspending causing an automatic change to said predetermined one of said plurality of subsystem control modes in which each subsystem is operating.

The method may comprise receiving a driving surface input signal from a user and controlling the plurality of vehicle subsystems to operate in a plurality of subsystem control modes in dependence on the driving surface input signal received from the user.

Optionally, selecting and/or determining automatically the driving surface comprises:

(1) for each type of control mode, calculating the probability that the control mode is suitable for the terrain or driving surface over which the vehicle is travelling, based on a plurality of terrain indicators, the terrain indicators being determined according to the value of one or more vehicle operating parameters;

(2) integrating positive differences between the probability for the current control mode and that for each of the other control modes; and (3) when the integrated value of the positive differences between the current control mode and one of the other control modes exceeds a pre-determined threshold, assuming that control mode.

Optionally the method comprises, during a torque interruption event, suspending changes in a predetermined one or more of the plurality of terrain indicators.

The method may comprise calculating, when a torque interruption event is not occurring, the predetermined one or more terrain indicators for which changes are suspended during a torque interruption event according to the value of one or more vehicle operating parameters indicative of one or more selected from amongst a speed of a portion of a driveline of a vehicle, a position of an accelerator control and an amount of torque generated by a prime mover of a powertrain.

Optionally the method comprises, during a torque interruption event, suspending calculating the probability that each type of control mode is suitable for the terrain or driving surface over which the vehicle is travelling.

The method may comprise determining that a torque interruption has occurred in dependence at least in part on the state of a user operated clutch control.

Optionally the method may comprise determining that a torque interruption has occurred in dependence at least in part on a determination that an automatic clutch has been activated to permit a change in selected gear ratio of a transmission.

The method may comprise determining that a torque interruption has occurred in dependence at least in part on the receipt of an electrical signal indicative of a change in selected gear ratio.

Optionally, the method comprises determining that a torque interruption has occurred in dependence at least in part on receipt of an electrical signal indicative of activation by a user of a transmission gear selector control.

Optionally, the method may comprise determining that a torque interruption has occurred if neither a forward nor a reverse gear of a transmission is selected.

The method may comprise determining that a torque interruption has occurred if a range change transmission of the vehicle is transitioning from a high range mode to a low range mode or a low range mode to a high range mode.

The control modes may be control modes of at least two vehicle subsystems selected from amongst an engine management system, a transmission system, a steering system, a brakes system and a suspension system.

In an aspect of the invention for which protection is sought there is provided a carrier medium carrying computer readable code for controlling a vehicle to carry out the method of a preceding aspect.

In one aspect of the invention for which protection is sought there is provided a computer program product executable on a processor so as to implement the method of another aspect.

In one aspect of the invention for which protection is sought there is provided a computer readable medium loaded with the computer program product of another aspect.

In one aspect of the invention for which protection is sought there is provided a processor arranged to implement the method of another aspect.

In an aspect of the invention for which protection is sought there is provided a motor vehicle control system for selecting and/or determining a driving surface and for controlling a plurality of vehicle subsystems to operate in a plurality of subsystem control modes in dependence on the selected/determined driving surface. The system is operable in an automatic control mode selection condition in which the system is configured to select said driving surface automatically and to cause each of the plurality of vehicle subsystems to operate in a predetermined subsystem control mode in dependence on the selected/determined driving surface, The system is configured to suspend causing a change in the subsystem control mode in which each subsystem is operating in dependence on the occurrence of a powertrain torque interruption event.

In one aspect of the invention for which protection is sought there is provided a method of controlling a motor vehicle implemented by a control system. The method comprises selecting and/or determining automatically a driving surface and controlling a plurality of vehicle subsystems to operate in a plurality of subsystem control modes in dependence on the selected/determined driving surface. The method also comprises suspending causing a change in the subsystem control mode in which each subsystem is operating in dependence on the occurrence of a powertrain torque interruption event.

Control systems according to embodiments of the present invention are suitable for a range of different vehicles including conventional engine-only vehicles, electric vehicles, and/or hybrid electric vehicles.

It is to be understood that a control mode may also be referred to as an operating mode.

It is to be understood that the controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The controller may be implemented in software run on one or more processors. One or more other controllers may be implemented in software run on one or more processors, optionally the same one or more processors as the controller. Other arrangements are also useful.

Some embodiments of the present invention provide a motor vehicle control system for controlling a plurality of vehicle subsystems to operate in a plurality of subsystem control modes in dependence on a driving surface. The system is operable in an automatic control mode selection condition in which the system is configured to determine said driving surface automatically and to cause each of the plurality of vehicle subsystems to operate in a predetermined one of said plurality of subsystem control modes in dependence on the determined driving surface. The system may be configured to determine if an interruption in powertrain torque occurs and to, in dependence on the identification of a powertrain torque interruption event, temporarily suspend causing an automatic change to said predetermined one of said plurality of subsystem control modes in which each subsystem is operating. Accordingly, in some embodiments when a driver changes a gear, for example by depressing a clutch pedal and moving a gear shift stick from a position in which one gear is selected to a position in which another gear is selected, the system may determine that a torque interruption has occurred when the clutch pedal is depressed. The system suspends allowing changes in driving mode until the torque interruption has terminated, i.e. drive torque to the driveline has been restored. This feature means that a change in driving mode to an inappropriate mode due to a temporary change in vehicle behavior associated with the torque interruption, such as a temporary reduction in wheel slip, may be avoided, thereby enabling the vehicle to continue operating in the most appropriate driving mode for the prevailing driving conditions.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which.

DETAILED DESCRIPTION

Figure 1:
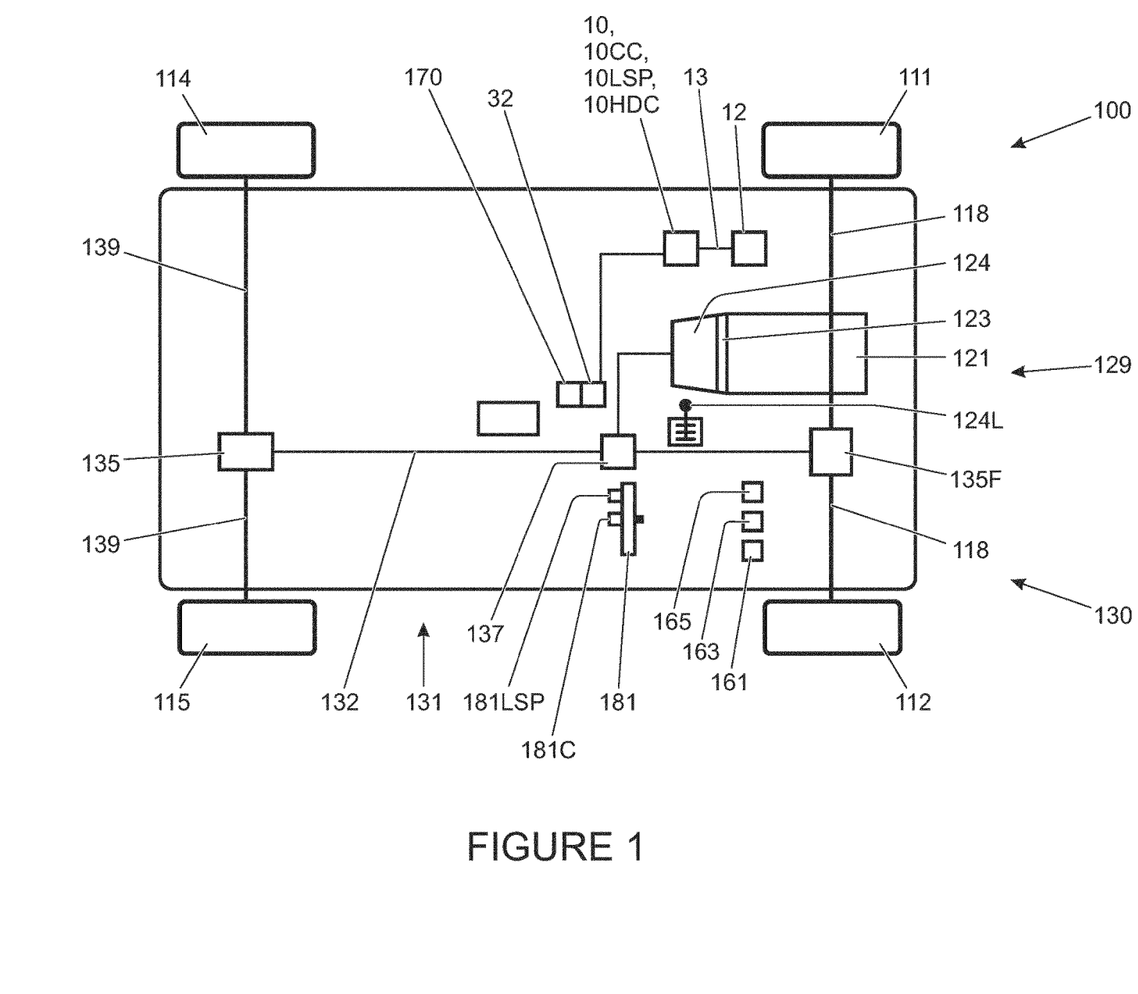
FIG. 1 is a schematic illustration of a vehicle according to an embodiment of the present invention.

FIG. 1 shows a vehicle 100 according to an embodiment of the invention intended to be suitable for off-road use, that is for use on terrains other than regular tarmac road, as well as on-road. The vehicle 100 has a powertrain 129 that includes an engine 121 that is connected to a driveline 130 having a transmission 124. The transmission 124 is a manual transmission 124, the vehicle 100 having a gear shift lever 124L permitting a driver to select the required gear in which the transmission 124 is to be operated. A clutch 123 is provided, operated by means of a clutch pedal 165, that permits the transmission 124 to be disconnected from a remainder of the driveline 130 when a gear shift operation is performed.

In some alternative embodiments the driveline 130 may be a "clutchless" driveline in which clutch pedal 165 is omitted. In some such embodiments, the driveline 130 is configured such that when the gear shift level 124L is moved from a position corresponding to the selection of one gear to a position corresponding to the selection of a different gear, the driveline 130 automatically decouples the engine 121 from the transmission 124 before changing gear, and automatically recouples the engine 121 to the transmission 124 after changing gear. Other arrangements may be useful in some embodiments.

The driveline 130 is arranged to drive a pair of front vehicle wheels 111,112 by means of a front differential 135F and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. It is to be understood that embodiments of the present invention are suitable for use with vehicles in which the transmission 124 is arranged to drive only a pair of front wheels or only a pair of rear wheels (i.e. front wheel drive vehicles or rear wheel drive vehicles) or selectable two wheel drive/four wheel drive vehicles, or permanent four wheel drive vehicles. In the embodiment of FIG. 1 the transmission 124 is releasably connectable to the auxiliary driveline portion 131 by means of a power transfer unit (PTU) 137, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

The PTU 137 is operable in a 'high ratio' or a low ratio' configuration, in which a gear ratio between an input shaft and an output shaft thereof is selected to be a high or low ratio. The high ratio configuration is suitable for general on-road or 'on-highway' operations whilst the low ratio configuration is more suitable for negotiating certain off-road terrain conditions and other low speed applications such as towing.

The vehicle 100 has an accelerator pedal 161 and a brake pedal 163 in addition to the clutch pedal 165, and a steering wheel 181. The steering wheel 181 has a cruise control selector button 181C mounted thereto for activating an on-highway cruise control system 10CC that is implemented in software by a vehicle central controller, referred to as a vehicle control unit (VCU) 10 described in more detail below. The steering wheel 181 is also provided with a low speed progress control selector button 181LSP for selecting operation of a low speed progress (LSP) control system 10LSP which may also be referred to as an off-road speed control or off-road cruise control system. The LSP control system 10LSP is also implemented in software by the VCU 10. In addition to the cruise control system 10CC and LSP control system 10LSP the VCU 10 is configured to implement a hill descent control (HDC) system 10HDC that limits maximum vehicle speed when descending an incline by automatic application of a brakes system 12d described in more detail below. The HDC system 10HDC may be activated via human machine interface (HMI) module 32.

The VCU 10 receives and outputs a plurality of signals to and from various sensors and subsystems 12 provided on the vehicle 100.

Figure 2:
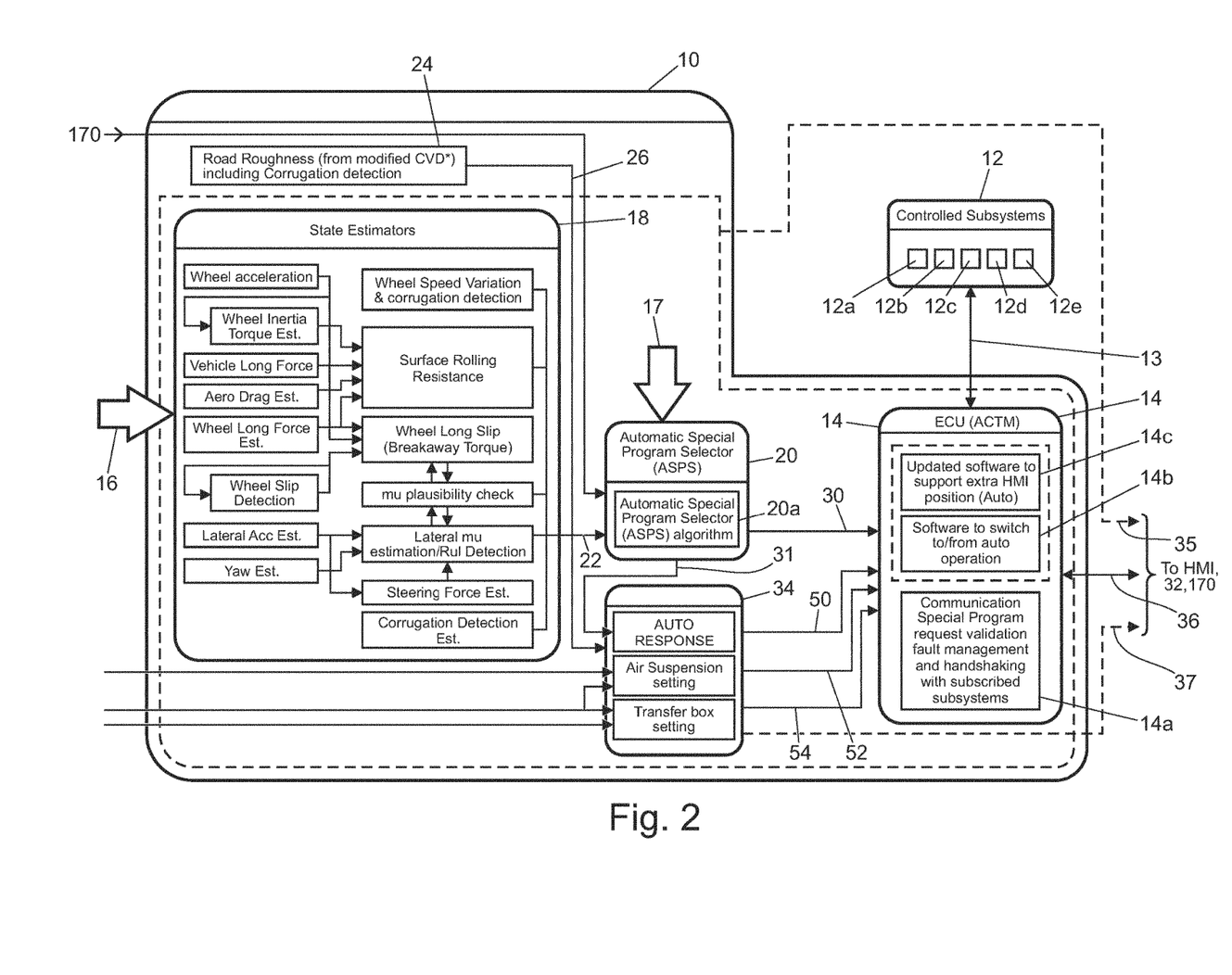
FIG. 2 is a block diagram to illustrate a vehicle control system in accordance with an embodiment of the invention, including various vehicle subsystems under the control of the vehicle control system.

FIG. 2 shows the VCU 10 in more detail. The VCU 10 controls a plurality of vehicle subsystems 12 including, but not limited to, an engine management system 12a, a transmission system 12b, an electronic power assisted steering unit 12c (ePAS unit), the brakes system 12d and a suspension system 12e. Although five subsystems are illustrated as being under the control of the VCU 10, in practice a greater number of vehicle subsystems may be included on the vehicle and may be under the control of the VCU 10. The VCU 10 includes a subsystem control module 14 which provides control signals via line 13 to each of the vehicle subsystems 12 to initiate control of the subsystems in a manner appropriate to the driving condition, such as the terrain, in which the vehicle is travelling (referred to as the terrain condition). The subsystems 12 also communicate with the subsystems control module 14 via signal line 13 to feedback information on subsystem status. In some embodiments, instead of an ePAS unit 12c, a hydraulically operated power steering unit may be provided.

The VCU 10 receives a plurality of signals, represented generally at 16 and 17, which are received from a plurality of vehicle sensors and are representative of a variety of different parameters associated with vehicle motion and status. As described in further detail below, the signals 16, 17 provide, or are used to calculate, a plurality of driving condition indicators (also referred to as terrain indicators) which are indicative of the nature of the condition in which the vehicle is travelling. One advantageous feature of some embodiments of the present invention is that the VCU 10 determines the most appropriate control mode for the various subsystems on the basis of the terrain indicators, and automatically controls the subsystems accordingly. That is, the VCU 10 determines the most appropriate control mode on the basis of the terrain indicators and automatically causes each of the subsystems 12 to operate in the respective subsystem configuration mode corresponding to that control mode.

The sensors (not shown) on the vehicle include, but are not limited to, sensors which provide continuous sensor outputs 16 to the VCU 10, including wheel speed sensors, an ambient temperature sensor, an atmospheric pressure sensor, tire pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an acceleration pedal position sensor and longitudinal, lateral, vertical motion sensors.

In other embodiments, only a selection of the aforementioned sensors may be used. The VCU 10 also receives a signal from the electronic power assisted steering unit (ePAS unit 12c) of the vehicle to indicate the steering force that is applied to the wheels (steering force applied by the driver combined with steering force applied by the ePAS unit 12c).

The vehicle 100 is also provided with a plurality of sensors which provide discrete sensor output signals 17 to the VCU 10, including a cruise control status signal (ON/OFF), a transfer box or PTU 137 status signal (whether the gear ratio is set to a HI range or a LO range), a Hill Descent Control (HDC) status signal (ON/OFF), a trailer connect status signal (ON/OFF), a signal to indicate that the Stability Control System (SCS) has been activated (ON/OFF), a windscreen wiper signal (ON/OFF), an air suspension ride-height status signal (HI/LO), and a Dynamic Stability Control (DSC) signal (ON/OFF).

The VCU 10 includes an evaluation means in the form of an estimator module or processor 18 and a calculation and selection means in the form of a selector module or processor 20. Initially the continuous outputs 16 from the sensors are provided to the estimator module 18 whereas the discrete signals 17 are provided to the selector module 20.

Within a first stage of the estimator module 18, various ones of the sensor outputs 16 are used to derive a number of terrain indicators. In a first stage of the estimator module 18, a vehicle speed is derived from the wheel speed sensors, wheel acceleration is derived from the wheel speed sensors, the longitudinal force on the wheels is derived from the vehicle longitudinal acceleration sensor, and the torque at which wheel slip occurs (if wheel slip occurs) is derived at least in part from a knowledge of instantaneous engine torque. Other calculations performed within the first stage of the estimator module 18 include the wheel inertia torque (the torque associated with accelerating or decelerating the rotating wheels), "continuity of progress" (the assessment of whether the vehicle is starting and stopping, for example as may be the case when the vehicle is travelling over rocky terrain), aerodynamic drag, yaw rate, and lateral vehicle acceleration.

The estimator module 18 also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel 181 (based on the lateral acceleration and the output from the steering wheel sensor), the wheel longitudinal slip (based on the longitudinal force on the wheels, the wheel acceleration, SCS activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface). Longitudinal friction or 'surface mu' (that is, surface coefficient of friction in a longitudinal direction with respect to the vehicle) may also be calculated by the estimator module 18. In some alternative embodiments the value of surface mu may be received by the estimator module 18 and not calculated by the estimator module 18.

The SCS activity signal is derived from several outputs from an SCS ECU (not shown), which contains the DSC (Dynamic Stability Control) function, the TC (Traction Control) function, ABS and HDC algorithms, indicating DSC activity, TC activity, ABS activity, brake interventions on individual wheels, and engine torque reduction requests from the SCS ECU to the engine 121. All these indicate a slip event has occurred and the SCS ECU has taken action to control it. The estimator module 18 also uses the outputs from the wheel speed sensors to determine a wheel speed variation and corrugation detection signal.

On the basis of the windscreen wiper signal (ON/OFF), the estimator module 18 also calculates how long the windscreen wipers have been in an ON state (i.e. a rain duration signal).

The VCU 10 also includes a road roughness module 24 for calculating the terrain roughness based on the air suspension sensors (the ride height sensors) and the wheel accelerometers. A terrain indicator signal in the form of a roughness output signal 26 is output from the road roughness module 24.

The estimates for the wheel longitudinal slip and the lateral friction estimation are compared with one another within the estimator module 18 as a plausibility check.

Calculations for wheel speed variation and corrugation output, the surface rolling resistance estimation, the wheel longitudinal slip and the corrugation detection, together with the friction plausibility check, are output from the estimator module 18 and provide terrain indicator output signals 22, indicative of the nature of the terrain in which the vehicle is travelling, for further processing within the VCU 10.

The terrain indicator signals 22 from the estimator module 18 are provided to the selector module 20 for determining which of a plurality of vehicle subsystem control modes (and therefore corresponding subsystem configuration modes) is most appropriate based on the indicators of the type of terrain in which the vehicle is travelling. The most appropriate control mode is determined by analyzing the probability that each of the different control modes is appropriate on the basis of the terrain indicator signals 22, 26 from the estimator module 18 and the road roughness module 24.

The vehicle subsystems 12 may be controlled automatically in a given subsystem control mode (in an "automatic mode" or "automatic condition" of operation of the VCU 10) in response to a control output signal 30 from the selector module 20 and without the need for driver input. Alternatively, the vehicle subsystems 12 may be operated in a given subsystem control mode according to a manual user input (in a "manual mode" or "manual condition" of operation of the VCU 10) via the HMI module 32. Thus the user determines in which subsystem control mode the subsystems will be operated by selection of a required system control mode (operating mode). The HMI module 32 comprises a display screen (not shown) and a user operable switchpack 170. The user may select between the manual and automatic modes (or conditions) of operation of the VCU 10 via the switchpack 170. When the VCU 10 is operating in the manual mode or condition, the switchpack 170 also allows the user to select the desired subsystem control mode.

It is to be understood that the subsystem controller 14 may itself control the vehicle subsystems 12a-12e directly via the signal line 13, or alternatively each subsystem may be provided with its own associated intermediate controller (not shown in FIG. 1) for providing control of the relevant subsystem 12a-12e. In the latter case the subsystem controller 14 may only control the selection of the most appropriate subsystem control mode for the subsystems 12a-12e, rather than implementing the actual control steps for the subsystems. The or each intermediate controller may in practice form an integral part of the main subsystem controller 14.

When operating in the automatic mode, the selection of the most appropriate subsystem control mode may be achieved by means of a three phase process:

(1) for each type of control mode, a calculation is performed of the probability that the control mode is suitable for the terrain over which the vehicle is travelling, based on the terrain indicators;

(2) the integration of "positive differences" between the probability for the current control mode and the other control modes; and (3) the program request to the control module 14 when the integration value exceeds a pre-determined threshold or the current terrain control mode probability is zero.

The specific steps for phases (1), (2) and (3) will now be described in more detail.

In phase (1), the continuous terrain indicator signals in the form of the road surface roughness output 26 and the outputs 22 from the estimator module 18 are provided to the selector module 20. The selector module 20 also receives the discrete terrain indicators 17 directly from various sensors on the vehicle, including the transfer box (PTU 137) status signal (whether the gear ratio is set to a HI range or a LO range), the DSC status signal, cruise control status (whether the vehicle's cruise control system 11 is ON or OFF), and trailer connect status (whether or not a trailer is connected to the vehicle). Terrain indicator signals indicative of ambient temperature and atmospheric pressure are also provided to the selector module 20. The estimator module also receives a signal indicative of the position of clutch pedal 165 and/or the position of gear lever 124L. In some embodiments, in addition to or instead of receiving a signal indicative of the position of gear level 124L the estimator module may receive a signal indicative of the selected gear configuration of the transmission, 124, that is whether the transmission is in a reverse gear configuration, a neutral configuration, or a forward driving gear configuration.

The selector module 20 is provided with a probability algorithm 20a for calculating the most suitable control mode for the vehicle subsystems 12a-e based on the discrete terrain indicator signals 17 received directly from the sensors and the continuous terrain indicators 22, 26 calculated by the estimator module 18 and the road surface roughness module 24, respectively. That is, the probability algorithm 20a calculates the most suitable system control mode, which determines the respective subsystem configuration mode in which each subsystem is to be operated, based on the discrete terrain indicator signals 17 and the continuous terrain indicators 22, 26.

The control modes typically include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode or SPO mode) which is a suitable compromise mode, or general mode, for all terrain conditions and especially vehicle travel on motorways and regular roadways. Many other control modes are also envisaged including those disclosed in US2003/0200016, the content of which is hereby incorporated by reference.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

Figure 3:
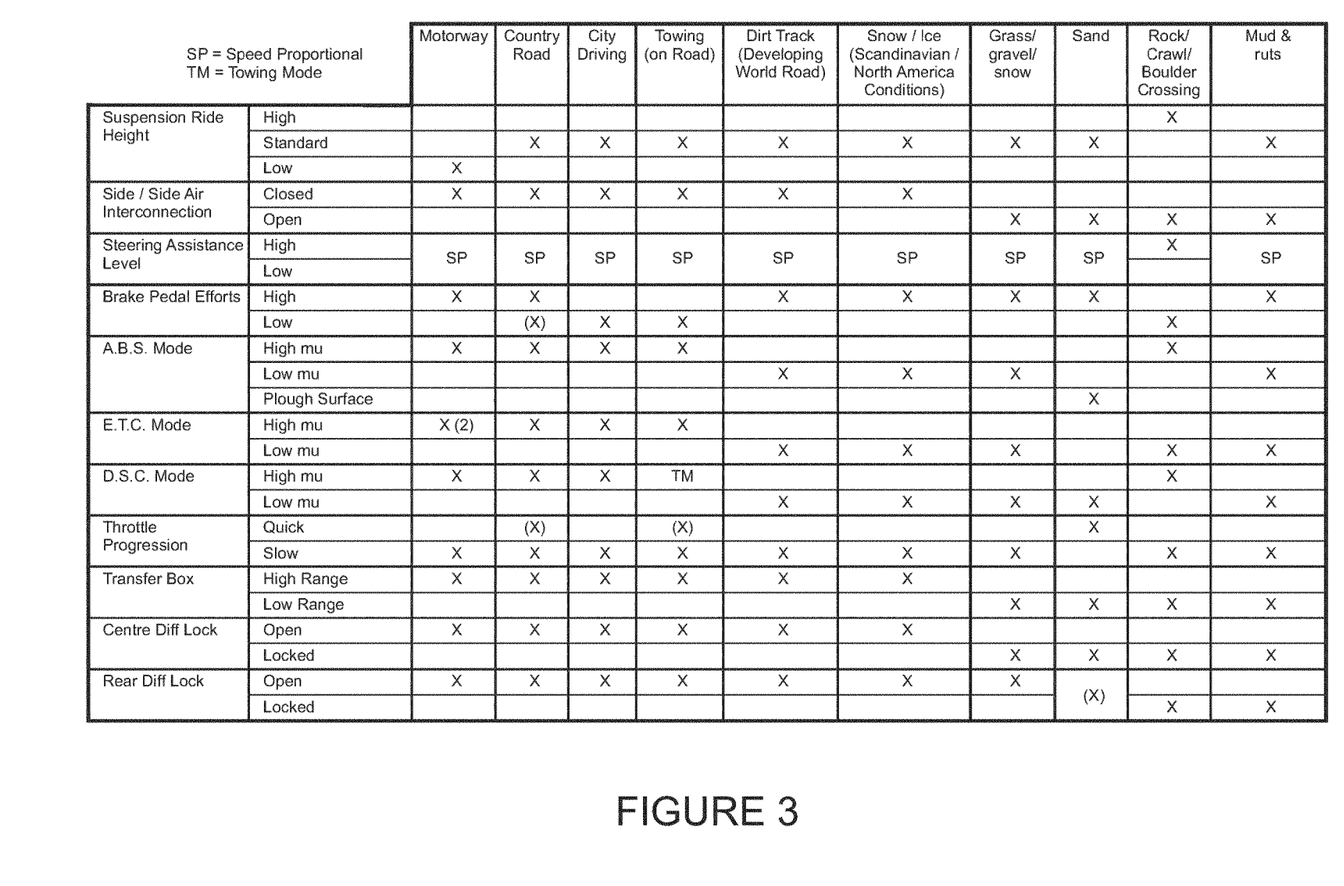
FIG. 3 is a table showing which vehicle subsystem configuration mode is selected in each respective vehicle operating mode.

FIG. 3 is a table taken from US2003/0200016 showing the particular sub-system configuration modes assumed by the subsystems 12 of the vehicle 100 in the respective different operating modes in which the VCU 10 may operate.

The operating modes are:
(a) A motorway (or highway) mode;
(b) A country road mode;
(c) A city driving (urban) mode;
(d) A towing (on-road) mode;
(e) A dirt track mode;
(f) A snow/ice (on-road) mode;
(g) A GGS mode;
(h) A sand mode;
(i) A rock crawl or boulder crossing mode; and
(j) A mud/ruts mode With reference to FIG. 3, the configuration of the suspension system 12e is specified in terms of ride height (high, standard or low) and side/side air interconnection. The suspension system 12e is a fluid suspension system, in the present embodiment an air suspension system, allowing fluid interconnection between suspensions for wheels on opposite sides of the vehicle in the manner described in US2003/0200016. The plurality of subsystem configuration modes provide different levels of said interconnection, in the present case no interconnection (interconnection closed) and at least partial interconnection (interconnection open).

The configuration of the ePAS steering unit 12c may be adjusted to provide different levels of steering assistance, wherein steering wheel 181 is easier to turn the greater the amount of steering assistance. The amount of assistance may be proportion to vehicle speed in some operating modes.

The brakes system 12d may be arranged to provide relatively high brake force for a given amount of pressure applied to the brake pedal 163 or a relatively low brake force, depending on the operating mode.

The brakes system 12d may also be arranged to allow different levels of wheel slip when an anti-lock braking system is active, (relatively low amounts on low friction ("low-mu" surfaces) and relatively large amounts on high friction surfaces).

An electronic traction control (ETC) system may be operated in a high mu or low mu configuration, the system tolerating greater wheel slip in the low mu configuration before intervening in vehicle control compared with the high mu configuration.

A dynamic stability control system (DSC) may also be operated in a high mu or low mu configuration.

The engine management system 12a may be operated in 'quick' or 'slow' accelerator (or throttle) pedal progression configuration modes in which an increase in engine torque as a function of accelerator pedal progression is relatively quick or slow, respectively. The rate may be dependent on speed in one or more modes such as Sand mode.

The PTU 137 may be operated in a high range (HI) subsystem configuration mode or low range (LO) subsystem configuration mode as described herein.

In some embodiments, a centre differential and a rear differential each include a clutch pack and are controllable to vary the degree of locking between a "fully open" and a "fully locked" state. The actual degree of locking at any one time may be controlled on the basis of a number of factors in a known manner, but the control can be adjusted so that the differentials are "more open" or "more locked". Specifically the pre-load on the clutch pack can be varied which in turn controls the locking torque, i.e. the torque across the differential that will cause the clutch, and hence the differential, to slip. A front differential could also be controlled in the same or similar way.

For each subsystem control mode, the algorithm 20a within the selector module 20 performs a probability calculation, based on the terrain indicators, to determine a probability that each of the different control modes is appropriate. The selector module 20 includes a tuneable data map which relates the continuous terrain indicators 22, 26 (e.g. vehicle speed, road roughness, steering angle) to a probability that a particular control mode is appropriate. Each probability value typically takes a value of between 0 and 1. So, for example, the vehicle speed calculation may return a probability of 0.7 for the RB mode if the vehicle speed is relatively slow, whereas if the vehicle speed is relatively high the probability for the RB mode will be much lower (e.g. 0.2). This is because it is much less likely that a high vehicle speed is indicative that the vehicle is travelling over a rock or boulder terrain.

In addition, for each subsystem control mode, each of the discrete terrain indicators 17 (e.g. trailer connection status ON/OFF, cruise control status ON/OFF) is also used to calculate an associated probability for each of the control modes, GGS, RB, Sand, MR or SP OFF. So, for example, if cruise control is switched on by the driver of the vehicle, the probability that the SP OFF mode is appropriate is relatively high, whereas the probability that the MR control mode is appropriate will be lower.

For each of the different subsystem control modes, a combined probability value, Pb, is calculated based on the individual probabilities for that control mode, as described above, as derived from each of the continuous or discrete terrain indicators 17, 22, 26. In the following equation, for each control mode the individual probability as determined for each terrain indicator is represented by a, b, c, d . . . n. The combined probability value, Pb, for each control mode is then calculated as follows:

$$Pb=(a.b.c.d. \ldots n)/((a.b.c.d \ldots n)+(1-a).(1-b).(1-c).(1-d) \ldots (1-n))$$

Any number of individual probabilities may be input to the probability algorithm 20a and any one probability value input to the probability algorithm may itself be the output of a combinational probability function.

Once the combined probability value for each control mode has been calculated, the subsystem control program corresponding to the control mode with the highest probability is selected within the selector module 20. The benefit of using a combined probability function based on multiple terrain indicators is that certain indicators may make a control mode (e.g. GGS or MR) more or less likely when combined together, compared with basing the selection on just a single terrain indicator alone.

In phase (2), an integration process is implemented continually within the selector module 20 to determine whether it is necessary to change from the current control mode to one of the alternative control modes.

The first step of the integration process is to determine whether there is a positive difference between the combined probability value for each of the alternative control modes compared with the combined probability value for the current control mode.

By way of example, assume the current control mode is GGS with a combined probability value of 0.5. If a combined probability value for the sand control mode is 0.7, a positive difference is calculated between the two probabilities (i.e. a positive difference value of 0.2). The positive difference value is integrated with respect to time. If the difference remains positive and the integrated value reaches a predetermined change threshold (referred to as the change threshold), or one of a plurality of predetermined change thresholds, the selector module 20 determines that the current terrain control mode (GGS) is to be updated to a new, alternative control mode (in this example, the sand control mode). A control output signal 30 is then output from the selector module 20 to the subsystem control module 14 to initiate the sand control mode for the vehicle subsystems.

In phase (3), the probability difference is monitored and if, at any point during the integration process, the probability difference changes from a positive value to a negative value, the integration process is cancelled and reset to zero. Similarly, if the integrated value for one of the other alternative control modes (i.e. other than the currently selected control mode, in the present example the sand control mode) reaches the predetermined change threshold before the probability result for the sand control mode, the integration process for the sand control mode is cancelled and reset to zero and the other alternative control mode, with a higher probability difference, is selected.

A further control signal 31 from the selector module 20 is provided to a control module 34. The outputs from the control module 34 to the subsystem control module 14 include a transfer box (PTU 137) setting signal 54 indicative of the setting (HI/LO) of the PTU 137, an air suspension setting signal 52 indicative of the air suspension configuration such as ride height, and a further signal 50. In the sub-system control module 14 a validation check or fault detection process 14a is carried out. The validation and fault detection process 14a operates so as to ensure that if one of the subsystems cannot support a selected control mode, for example because of a fault, appropriate action is taken (e.g. in the form of a warning).

As described above, in the embodiment of FIG. 1, the VCU 10 is configured wherein an integration process is implemented continually within the selector module 20 and a determination made whether it is necessary to change from the current control mode to one of the alternative control modes. If the integrated value for one of the alternative control modes reaches the predetermined change threshold before that for the current control mode, the integration process for the current control mode is cancelled and reset to zero and the other alternative control mode, with a higher probability difference, is selected.

In the present embodiment, if the VCU 10 is operating in the automatic mode selection condition and the VCU 10 determines by means of an input signal that either clutch pedal 165 has been depressed or the transmission 124 has assumed a neutral gear condition, the selector module 20 assumes a suspension condition in which the selector module 20 suspends commanding changes in the selected control mode output to the subsystem control module 14. In other words, the selector module 20 does not command a change in subsystem control mode by the subsystem control module 14 via control output signal 30 when in the suspension condition. In some embodiments the selector module 20 may also assume the suspension condition if it detects that the PTU 137 is transitioning from the LO condition to the HI condition or from the HI condition to the LO condition.

This feature has the advantage that changes in subsystem control mode due to changes in vehicle behavior associated with the act of changing gear do not cause a change in subsystem control mode to a mode that is inappropriate to the prevailing terrain. For example, a change in the prevailing amount of wheel slip may take place due to interruption of powertrain torque to the wheels when the clutch 165 is depressed, resulting in erroneous estimation of the terrain and the triggering of a change to an inappropriate control mode. For example, a reduction in wheel slip may occur due to the interruption in powertrain torque delivered to one or more wheels. A change in the amount of wheel slip may for example result in a change in an estimation of the prevailing value of coefficient of friction between driving wheels and the surface over which the vehicle is driving, and trigger a change in control mode. In some embodiments the estimation of the prevailing value of coefficient of friction between driving wheels and the surface over which the vehicle is driving may be made by the estimator module 18. In some alternative embodiments the value of coefficient of friction may be received by the estimator module or selector module from another source.

During the period for which the selector module 20 is in the suspension condition, the estimator module 18 terminates calculation of certain terrain indicators 22 that are calculated based on signals associated with the driveline 130 such as wheel speed signals, engine torque signal and accelerator pedal position signal. This is because the values of one or more of these signals during a period of powertrain torque interruption may be such as to provide a misleading indication of the nature of the terrain over which the vehicle 100 is driving. The value of the one or more terrain indicators calculation of which is terminated are frozen at the prevailing value when the torque interruption occurs.

In some alternative embodiments, the estimator module 18 may continue calculation of these terrain indicators, but the selector module 20 may apply a reduced weight to these terrain indicators in calculating the probability that a given control mode is the most appropriate mode for the prevailing terrain conditions.

In some embodiments the data received by the estimator module 18 may be categorized as 'reliable' or 'unreliable' in dependence on whether the selector module 20 has assumed the suspension condition. Data categorized as 'unreliable' may include data associated with the driveline 130 such as wheel speed signals, engine torque signal and accelerator pedal position signal. Other received data may be categorized as 'reliable'. Terrain indicators calculated by the estimator module 18 based on data categorized as reliable may continue to be calculated. However, terrain indicators calculated by the estimator module 18 based on data categorized as unreliable may no longer be calculated. As noted above, in the present embodiment the estimator module 18 effectively freezes the value of terrain indicators that would otherwise be calculated based on unreliable data, and provides to the selector module 20 the prevailing values of these terrain indicators 22 immediately prior to the selector module assuming the suspension condition.

In some alternative embodiments the selector module 20 may in addition suspend the integration process, that is, the integration of positive differences between the probability for the current control mode and the probability for the other control modes. The selector module 20 may freeze the integrated values of the positive differences at the moment the suspension condition is assumed, and unfreeze the values when the suspension condition is subsequently terminated. It is to be understood that during the period in which the selector module 20 is in the suspension condition the selector module 20 may ignore the terrain indicator output signals 22 provided to it by the estimator module 18. Other arrangements may be useful in addition or instead in some embodiments. In some embodiments the selector module 20 may ignore one or more of the continuous terrain indicator signals 17 and/or signal 26 received from the road roughness module 24. Optionally, the value of one or more of the continuous terrain indicator signals 17 and/or signal 26 may be frozen at its prevailing value when the torque interruption occurs and the selector module 20 assumes the suspension condition.

The VCU 10 continues to monitor the position of the clutch pedal 165 and the selected gear condition of the transmission 124. Once the VCU 10 determines that the conditions are met that the clutch pedal 165 is in a released condition, and the transmission 124 is in a condition other than the neutral condition, the VCU 10 permits the selector module 20 to resume automatic selection of the control mode with the highest probability difference as described above.

The estimator module 18 also recommences calculation of terrain indicators that are calculated based on signals associated with the driveline 130 such as wheel speed signals, engine torque signal and accelerator pedal position signal.

In embodiments in which the selector module 20 suspends integration of positive differences between the probability for the current control mode and the other control modes during the period in which it is in the suspension condition 20, the selector module 20 may resume the integration process once the suspension condition 20 is terminated. In some embodiments the selector 20 may resume the integration process starting with the integrated values prevailing when the selector module 20 suspended integration of positive differences between probabilities described above. In some alternative embodiments the selector module 20 may reset the integrated values to zero or other predetermined value and recommence the integration process. Other arrangements may be useful in some embodiments.

In some embodiments the selector module 20 may be configured to delay exiting the suspension condition and therefore delay resumption of automatic selection of the control mode with the highest probability difference, until a predetermined time period has passed or a predetermined distance has been travelled since the conditions were met that the clutch pedal 165 is in a released condition, and the transmission 124 is in a condition other than the neutral condition.

The predetermined distance or time period may be dependent at least in part on the speed at which the vehicle is travelling in some embodiments, the distance or time period being lower for lower vehicle speeds, so that an excessive delay does not occur before resumption of the integration process and changes in control mode are permitted.

Figure 4:
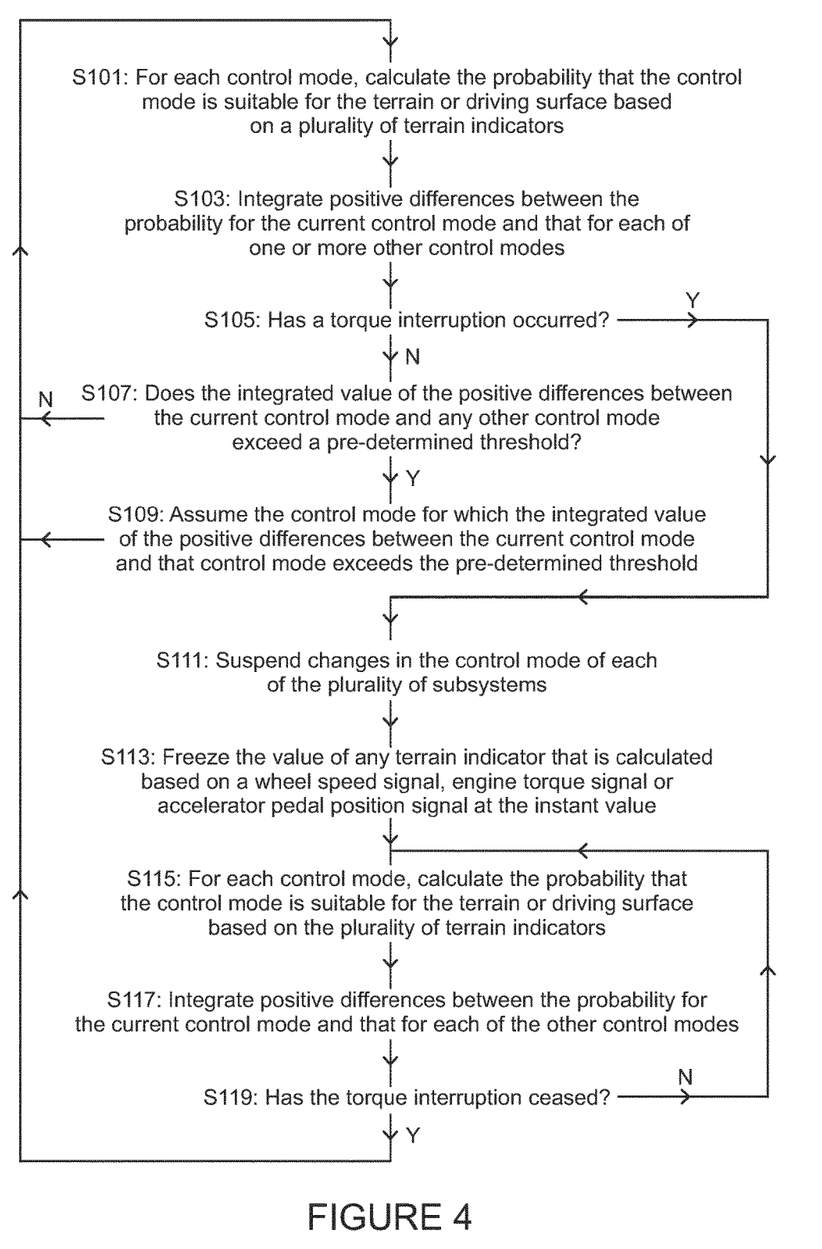
FIG. 4 is a flow diagram illustrating a method of operation of a vehicle according to an embodiment of the present invention.

A method of controlling a vehicle according to an embodiment of the present invention will now be described with reference to FIG. 4.

At step S101 the selector module 20 calculates, for each control mode, the probability that the control mode is suitable for the terrain or driving surface using probability algorithm 20a as described above and based on a plurality of terrain indicator signals 22, 26, 17 including those provided to it by the estimator module 18.

At step S103 the selector module 20 integrates positive differences between the probability for the current control mode and that for each of the other available control modes.

At step S105 the selector module 20 checks whether a torque interruption occurred. If a torque interruption has occurred the selector module continues at step S111 else the selector module 20 continues at step S107.

At step S107 the selector module 20 determines whether the integrated value of the positive differences between the current control mode and any other allowable control mode exceeds a pre-determined threshold. If the integrated value does not exceed the threshold then the method continues at step S101 else the method continues at step S109.

At step S109 the selector module 20 causes the VCU 10 to assume the control mode for which the integrated value of the positive differences between the current control mode and that control mode exceeds the pre-determined threshold. The method then continues at step S101.

At step S111 the selector module 20 suspends changes in the control mode of each of the plurality of subsystems.

At step S113 the selector module 20 freezes the value of any terrain indicator signal 22, 26, 17 that is calculated based on a wheel speed signal, engine torque signal or accelerator pedal position signal at the instant value.

Subsequently, at step S115, the selector module 20 calculates, for each control mode, the probability that the control mode is suitable for the terrain or driving surface based on the plurality of terrain indicators. In the case of terrain indicators the value of which has been frozen, the selector module 20 employs the frozen values.

At step S117 the selector module 20 integrates positive differences between the probability for the current control mode and that for each of the other control modes.

At step S119 the selector module 20 determines by reference to a signal indicative of the position of clutch pedal 165 and a signal indicative of the position of gear lever 124L whether the torque interruption has ceased. If the signal indicative of clutch pedal position indicates the clutch pedal 165 is in a released condition and the gear level 124L is in a position corresponding to a forward or reverse gear being selected (and not a neutral condition), the selector module 20 determines that the torque interruption has ceased and continues at step S101. If both of these conditions are not met, the selector module 20 determines that the torque interruption has not ceased, and continues at step S115.

Some embodiments of the present invention have the advantage that vehicle composure may be preserved and in some embodiments or situations composure may be enhanced. Some embodiments have the advantage that user confidence in vehicle operation performance and expected response may be enhanced. Automatic terrain recognition and control mode selection may be made with greater confidence.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A motor vehicle control system for controlling a plurality of vehicle subsystems to operate in a plurality of subsystem control modes in dependence on one or more of a plurality of terrain indicators that are indicative of a driving surface, the system being operable in an automatic control mode selection condition in which the system is configured to determine said driving surface automatically and to cause each of the plurality of vehicle subsystems to operate in a predetermined one of said plurality of subsystem control modes in dependence on the determined driving surface,
wherein the system is configured to determine if an interruption in powertrain torque occurs and, in dependence on the identification of a powertrain torque interruption event, to temporarily suspend causing an automatic change to said predetermined one of said plurality of subsystem control modes in which each subsystem is operating, and to either suspend changes in a predetermined one or more of the plurality of terrain indicators, or reduce a weight applied to one or more of the plurality of terrain indicators in estimating the most appropriate control mode for the determined driving surface.

2. A motor vehicle control system according to claim 1 further operable in a manual control mode selection condition in which a user may select manually the driving surface.

3. A system according to claim 1 wherein when operating in the automatic control mode selection condition, the system is configured to select the most appropriate subsystem control mode by:
(1) for each type of control mode, calculating the probability that the control mode is suitable for the terrain or driving surface over which the vehicle is travelling, based on the plurality of terrain indicators, the terrain indicators being determined according to the value of one or more vehicle operating parameters;
(2) integrating positive differences between the probability for the current control mode and that for each of the other control modes; and
(3) when the integrated value of the positive differences between the current control mode and one of the other control modes exceeds a pre-determined threshold, assuming that control mode.

4. A system according to claim 3 configured, during a torque interruption event, to suspend changes in the probability that each type of control mode is suitable for the terrain or driving surface over which the vehicle is travelling.

5. A system according to claim 1 wherein the predetermined one or more terrain indicators for which changes are suspended are terrain indicators calculated according to the value of one or more vehicle operating parameters indicative of one or more selected from amongst a speed of a portion of a driveline of a vehicle, a position of an accelerator control and an amount of torque generated by a prime mover of a powertrain.

6. A system according to claim 1 configured to determine that a torque interruption has occurred in dependence at least in part on the state of a user operated clutch control.

7. A system according to claim 1 configured to determine that a torque interruption has occurred in dependence at least in part on a determination that an automatic clutch has been activated to permit a change in selected gear ratio of a transmission.

8. A system according to claim 1 configured to determine that a torque interruption has occurred in dependence at least in part on the receipt of an electrical signal indicative of a change in selected gear ratio.

9. A system according to claim 8 configured to determine that a torque interruption has occurred in dependence at least in part on receipt of an electrical signal indicative of activation by a user of a transmission gear selector control.

10. A system according to claim 1 configured to determine that a torque interruption has occurred if neither a forward nor a reverse gear of a transmission is selected.

11. A system according to claim 1 configured to determine that a torque interruption has occurred if a range change transmission of the vehicle is transitioning from a high range mode to a low range mode or a low range mode to a high range mode.

12. A system according to claim 1 wherein the control modes are control modes of at least two vehicle subsystems selected from amongst an engine management system, a transmission system, a steering system, a brakes system and a suspension system.

13. A system according to claim 1 comprising a controller.

14. A vehicle comprising a system according to claim 1.

15. A vehicle comprising a chassis, a body attached to said chassis, a plurality of wheels, a powertrain to drive said wheels, a braking system to brake said wheels, and a system according to claim 1.

16. A method of controlling a plurality of vehicle subsystems to operate in a plurality of subsystem control modes in dependence on one or more of a plurality of terrain indicators that are indicative of a driving surface, the method comprising determining said driving surface automatically and causing each of the plurality of vehicle subsystems to operate in a predetermined one of said plurality of subsystem control modes in dependence on the determined driving surface,
the method comprising determining if an interruption in powertrain torque occurs and, in dependence on the identification of a powertrain torque interruption event: temporarily suspending causing an automatic change to said predetermined one of said plurality of subsystem control modes in which each subsystem is operating, and either suspending changes in a predetermined one or more of the plurality of terrain indicators, or reducing a weight applied to one or more of the plurality of terrain indicators in estimating the most appropriate control mode for the determined driving surface.

17. A non-transitory carrier medium carrying a computer readable code for controlling a vehicle to carry out the method of claim 16.

18. A vehicle including a processor and computer program product executable on the processor so as to implement the method of claim 16.

19. A processor arranged to implement the method of claim 16.

20. A motor vehicle control system for controlling a plurality of vehicle subsystems to operate in a plurality of subsystem control modes in dependence on one or more of a plurality of terrain indicators that are indicative of a driving surface, the system being operable in an automatic control mode selection condition in which the system is configured to determine said driving surface automatically and to cause each of the plurality of vehicle subsystems to operate in a predetermined one of said plurality of subsystem control modes in dependence on the determined driving surface,
  wherein the system is configured, in dependence on the identification of a powertrain torque interruption event: to temporarily suspend causing an automatic change to said predetermined one of said plurality of subsystem control modes in which each subsystem is operating; and, to either suspend changes in a predetermined one or more of the plurality of terrain indicators, or to reduce a weight applied to one or more of the plurality of terrain indicators in estimating the most appropriate control mode for the determined driving surface.

* * * * *